United States Patent [19]

Itoh

[11] Patent Number: 5,115,259
[45] Date of Patent: May 19, 1992

[54] ELECTROPHOTOGRAPHIC IMAGE FORMING APPARATUS

[75] Inventor: Masahiro Itoh, Sagamihara, Japan

[73] Assignee: Canon Kabushiki Kaisha, Tokyo, Japan

[21] Appl. No.: 714,838

[22] Filed: Jun. 13, 1991

[30] Foreign Application Priority Data

Jun. 15, 1990 [JP] Japan .................... 2-158469

[51] Int. Cl.$^5$ .................... G03G 15/01; G03G 15/04
[52] U.S. Cl. .................... 346/157; 346/160; 346/108
[58] Field of Search .................... 346/160, 108, 157; 359/206, 218

[56] References Cited

U.S. PATENT DOCUMENTS

| | | | |
|---|---|---|---|
| 4,722,581 | 2/1988 | Hamada et al. | 359/218 |
| 4,763,134 | 8/1988 | Murahashi et al. | 346/108 X |
| 4,796,964 | 1/1989 | Connell et al. | 359/206 X |
| 4,987,426 | 1/1991 | Ota et al. | 346/108 |
| 5,057,851 | 10/1991 | Hattori | 346/108 X |

FOREIGN PATENT DOCUMENTS 63-279278  11/1988  Japan .................... 346/157

*Primary Examiner*—Joan H. Pendegrass
*Attorney, Agent, or Firm*—Fitzpatrick, Cella, Harper & Scinto

[57] ABSTRACT

An electrophotographic image forming apparatus includes a movable electrophotographic photosensitive member; laser beam source for providing a laser beam modulated in accordance with signals representing images to be recorded; a scanning optical system for scanningly deflecting the laser beam in a main scan direction, wherein a spot diameter ($x(1/e^2)$), measured in the main scan detection, of a spot of the laser beam formed on the photosensitive member is not more than 45 microns, and an intensity distribution ($x(1/e^2)/x(1/e)$) thereof in the main scan direction is not more than 1.6; a developing device for developing in a developing zone an electrostatic latent image formed by the laser beam on the photosensitive member; and supporting means for supporting the developing means to face it in the developing zone to the photosensitive member without contact thereto.

14 Claims, 11 Drawing Sheets

ELECTROPHOTOGRAPHIC IMAGE FORMING APPARATUS

FIELD OF THE INVENTION AND RELATED ART

The present invention relates to an electrophotographic image forming apparatus wherein an electrostatic latent image is formed by sweeping an electrophotographic photosensitive member with a laser beam modulated in accordance with the image to be recorded, and the latent image is developed with toner into a toner image.

Referring first to FIG. 1, there is shown an example of an electrophotographic image forming apparatus for forming an electrostatic latent image using a laser beam. In accordance with the image signal supplied, a solid laser element (semiconductor laser) 202 is turned on and off at predetermined timing by a laser drive pulse signal generator 201. The laser beam L emitted from the solid laser element 202 is converted to a substantially a focal beam by a collimator lens system 203. It is deflected by a rotating mirror 204 having a plurality of mirror surfaces and rotating in a direction indicated by an arrow b to effect scan in the main scan direction (C), and is imaged as a spot on a surface to be scanned (photosensitive surface of a rotating electrophotographic photosensitive drum 3, by an f-$\theta$ lens 205 constituted by lenses 205a, 205b and 205c.

By the scanning with the laser beam L, an electrostatic latent image corresponding to one scan is formed on the surface to be scanned 3, and the surface to be scanned 3 is incrementally fed for each main scan in a subordinate scanning direction which is substantially perpendicular to the direction of the main scan. By doing so, an electrostatic latent image is formed on the surface to be scanned 3 in accordance with the image signal. The latent image is visualized by a known electrophotographic developing device 1, and the developed image is transferred onto a recording sheet or paper.

The developing device 1 for developing the electrostatic latent image generally includes a developing roller 2 usually in the form of a sleeve to carry a developer to a developing zone where the toner is supplied to the electrophotographic photosensitive member to visualize the latent image.

In such a developing device, in order to assure a distance d between a developing roller for carrying the developer and a photosensitive drum 1 in the form of a cylinder, spacer rollers 109 are supported coaxially with the developing roller 102 and are abutted to the photosensitive drum 1 or disks supported coaxially with the drum 1.

The spacer rollers 109 have a radius equal to the radius R of the developing roller 102 plus the distance d to exist between the developing roller 102 and the photosensitive drum 1.

Such a structure is used (1) because the distance d between the developing roller 102 and the photosensitive drum 1 is significantly influential to the density and the quality of the image formed and (2) because the distance is usually very small. Recent demand to the image forming apparatus such as a printer or a copying machine includes the color graphic output or the like which require higher quality of images. In order to accomplish it, that is, in order to develop the latent image on the photosensitive drum 1 more faithfully, the distance d between the photosensitive drum 1 and the developing roller 102 is further reduced, more particularly, to not more than 1 mm.

In the image forming apparatus of the above described type, it is unavoidable that some developer is released and scattered from the surface of the developing roller 102 and that some developer is released and scattered from the surface of the photosensitive drum 1. If the released and scattered developer reaches the contact surfaces between the spacer roller 109 and the photosensitive drum 1, the developer is compressed by the contact surfaces, with the result that the developer is fused on the surface of the spacer roller 102 or the surface of the photosensitive drum 1. Then, small projections are formed on the surfaces.

The projections thus formed impede smooth rotation of the photosensitive drum 1 and the roller 109 which are contacted during the rotation. As a result, during the rotation, the distance d between the developing roller 102 and the photosensitive drum 1 changes, or the photosensitive drum 1 is vibrated, or the vibration is transmitted to the optical system, and therefore, the latent or developed image is disturbed to obstruct the high quality image formation. Particularly in the case of a multi-color image forming apparatus wherein plural color images are overlaid, the disturbances in the respective color images are combined to deteriorate the image quality.

When the developer is fused on the surface of the spacer roller 109 and/or the surface of the photosensitive drum 1, the distance d significantly influential to the image formation increases, and therefore, the strength of the developing electric field existing in the distance d decreases, so that the density of the developed image is decreased as a hole.

In an image forming apparatus wherein plural developing units are used to be sequentially presented for the developing operation to form a multi-color image, as disclosed in U.S. Pat. No. 4,622,916, abutment action can not be avoided between the spacer roller 109 of the developing unit coming to the developing position and the photosensitive drum 1. If the abutment occurs between the spacer roller 109 and the photosensitive drum 1 while the latent image forming operation is being carried out, the quality of the image is locally deteriorated due to the vibration of the optical system or the vibration of the image bearing member caused by the abutment action. The deteriorations of the images of the different colors are influential to each other with the result that the quality of the total color image is remarkably deteriorated.

On the other hand, a laser beam printer for effecting binary level recording using a laser beam is known. In order to record a halftone image in the laser beam printer of the binary level recording, a dither method, density pattern method or the like are known. As is known, however, the dither method and the density pattern method are not suitable to provide a high resolution image. Recently, a proposal has been made as to the system for recording a halftone image without reducing the record density and the resolution. In this system, the halftone image is recorded by modulating a width of a pulse signal for driving the laser in accordance with the image signal. More particularly, the on-period of the beam per one picture element of the laser is controlled in accordance with the density of the image to be recorded. In other words, the exposure period of the photosensitive member per one picture element (pixel) by the laser beam scanning the photosensitive member is controlled in accordance with the density of the image. More particularly, the pulse width is short for the low density portion of the image to provide the long exposure period, whereas the pulse width is long for the high density image portion to provide the longer exposure period. In accordance with the pulse width modulation system (PWM system), the image can be formed with high resolution and high tone gradation, and is particularly suitable for a color image forming apparatus which requires the high resolution and the high tone gradation.

In the PWM system, the area tone gradation is possible for the dot formed by the beam spot per one pixel, and therefore, the halftone gradation is represented without decreasing the density of the pixels (recording density).

In the above-described PWM type image forming apparatus, in order to perform a high density image recording, it is desirable that the size of the spot of the laser beam on the surface to be scanned, that is the surface of the photosensitive drum 3 is reduced in accordance with the image density at which the image is recorded.

For example, when the spot is turned on or off for each of the picture elements, and it has a Gaussian illuminance distribution, the exposure distribution on the surface to be scanned 3, as shown in FIG. 2, depending on the diameter of the spot on the surface 3 to be scanned.

More particularly, when the diameter of the spot in the main scan direction is small, the exposure distribution by the laser beam is close to a rectangular wave matching the on-and-off of the beam, and the contrast is high. However, with the increase of the spot diameter, the laser beam influences adjacent picture elements, and the amplitude of the exposure distribution is small, with the result of low image contrast. Then, the quality of the output image is deteriorated. When a high resolution printer capable of providing 800 dpi (32 dots/mm) printing, the diameter of the imaged spot on the photosensitive drum 3 in the main scan direction is required to be 40 microns or lower, in order to increase the contrast to 80 % or higher (in this Specification, the spot diameter of the laser beam $\times(1/e^2)$ is a width, measured in the main scan direction, of the laser beam spot at such a portion in the Gaussian light intensity distribution as has the strength which is $(1/e^2)\times$ maximum intensity.

In order to obtain such a fine diameter laser spot, an imaging optical system having a large F/N number. However, as is well-known, the focal depth of the imaging optical system decreases with the increase of F/N number.

When, for example, the apparatus is capable of scanning with an imaged spot having a diameter of approximately 40 microns in the main scan direction, the focal position of the imaging optical system has to be positioned within a very small range such as ±0.8 mm from the surface 3 to be scanned.

A conventional apparatus wherein the developing device is provided with abutting rollers 109 which are abutted to the photosensitive drum 3 which is the surface to be scanned which is to be placed correctly at the focus position of the imaging optical system, the focal surface may vibrate, because of vibration of the optical system or the photosensitive drum due to the toner fused and caked on the rollers 109, or because of the impact to the photosensitive drum and the resultant vibration of the optical system due to the rollers 109 in the case that the developing device is moved to and away from the photosensitive drum 3. If this occurs, the surface to be scanned may be deviated from the focal position, with result that the fine laser spot diameter on the photosensitive drum 3 relatively significantly changes. This decreases the contrast of the latent image Then, despite the use of the fine spot, the resultant image may lack the sharpness and the tone reproducibility.

SUMMARY OF THE INVENTION

Accordingly, it is a principal object of the present invention to provide an electrophotographic image forming apparatus using a laser beam, which can provide a high quality image.

It is another object of the present invention to provide an electrophotographic image forming apparatus capable of using a fine laser beam spot to provide a high quality of images.

It is a further object of the present invention to provide an electrophotographic image forming apparatus capable of producing high quality images having good tone reproduction.

According to an embodiment of the present invention, the electrophotographic photosensitive member is scanned with a laser beam spot having a diameter $\times(1/e^2)$ is not more than 45 microns in the main scan direction and having an intensity distribution $\times(1/e^2)/\times(1/e)$ of not more than 1.60 to form an electrostatic latent image, which is developed by a developing device not contacted to the electrophotographic photosensitive member, by which a high contrast picture element latent image can be stably produced at high image density. Therefore, a high resolution toner image can be produced. When this embodiment is used with the PWM type, good images having high tone reproducibility can be stably produced. In this sense, the embodiment is particularly effective when it is used with a color image forming apparatus which requires the high quality for each of the respective color component images in consideration of the fact that plural color images are superposed.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 3:
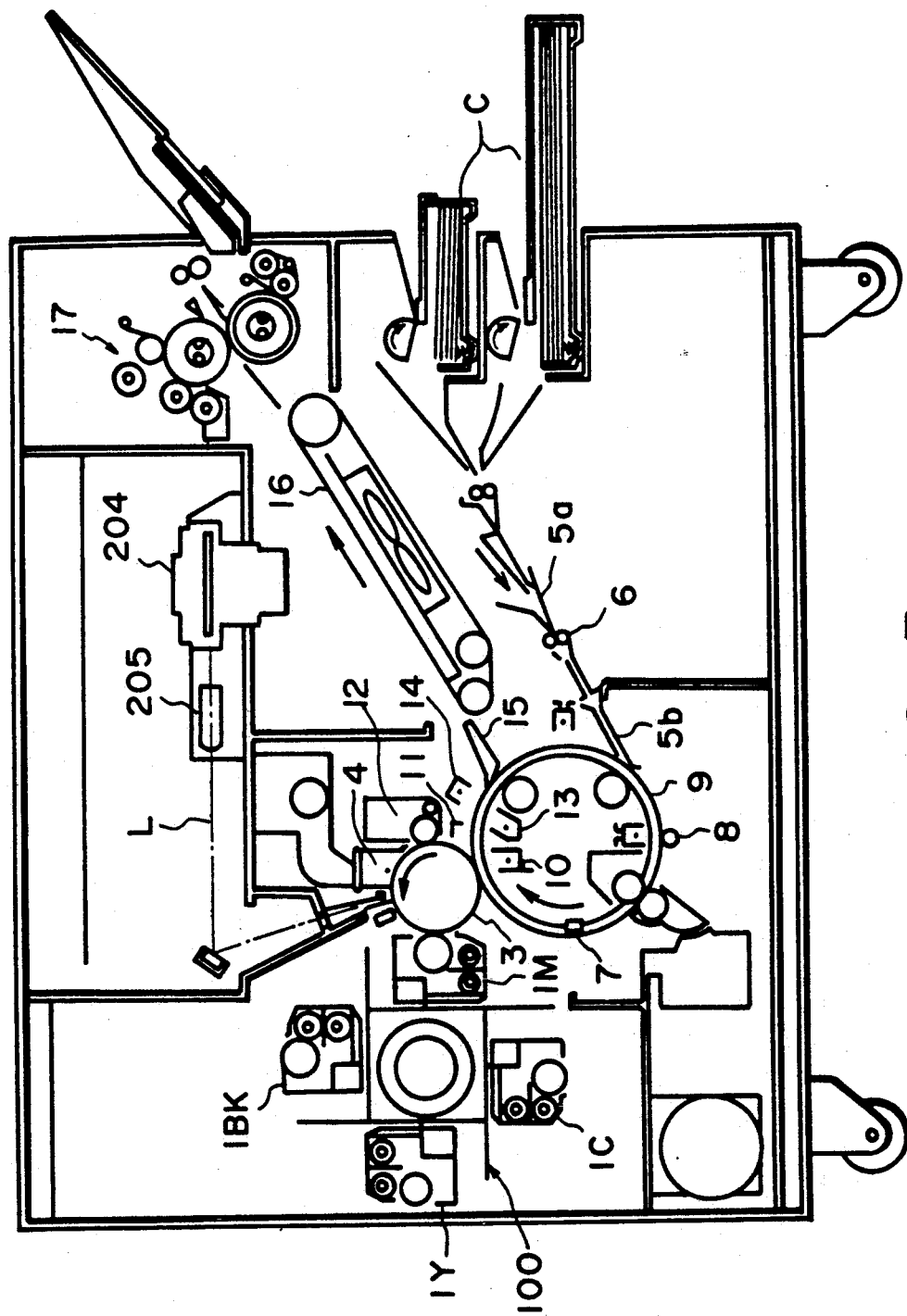
FIG. 3 is a sectional view of a color image printer to which the present invention is applicable.

Referring to FIG. 3, there is shown a color printer of an electrophotographic type to which the present invention is applicable.

The printer includes an electrophotographic photosensitive drum 3 (image bearing member) rotatable in a direction of an arrow. Around the photosensitive drum 3, there are disposed a charger 4, a rotary type developing apparatus 100 having developing devices 1M, 1C, 1Y and 1BK, an image transfer discharger 10, cleaning means 12, a laser beam scanner 204 and f-$\theta$ lens 205 disposed at the upper position in the drawing. These elements constitute an image forming means. Each of the developing devices is effective to supply to the drum 3 a two-component developer comprising toner particles and carrier particles. The developing device 1M contains magenta toner; the developing device 1C contains cyan toner; the developing device 1Y contains yellow toner; and the developing device 1BK contains black toner.

The original to be copied is read by an unshown original reader. The reader has photoelectric transducer elements such as CCD (charge coupled device) or the like for converting an image of an original to electric signals. It produces image signals corresponding to magenta image information, cyan image information, yellow image information and black-white image information of the original, respectively. A semiconductor laser 202 (FIG. 4) contained in the printer is controlled in accordance with the image signal to produce a laser beam L. It is possible to print out output signal from a computer The sequence of the operation of the color printer will be briefly described, taking as an example the full-color mode. First, the photosensitive drum 3 is uniformly charged by the charger 4. The photosensitive drum 3 is then scanned with and exposed to the laser beam L modulated in accordance with magenta image signal, so that an electrostatic latent image is formed on the photosensitive drum 3. The latent image is reverse-developed by a magenta developing device 1M already brought to the developing position.

The transfer material such as paper is supplied from a cassette C along the sheet guide 5a, a sheet feeding roller 6 and a sheet guide 5b. The transfer material is held by a gripper 7 of a transfer drum 9 and is electrostatically retained thereon by the function of a contact roller 8 and an opposite electrode therefore. The transfer drum 9 rotates in the direction indicated by an arrow in synchronism with the photosensitive drum 3. The magenta developed image provided by the magenta developing device 1M is transferred onto the transfer material by the transfer charger 10 at the transfer station. The transfer drum 9 continues to rotate as it is, and it is prepared for receiving the next color image (cyan in the example of FIG. 1).

On the other hand, the photosensitive drum 3, after being subjected to the image transfer operation, is electrically discharged by the charger 11 and then is cleaned by the cleaning means 12. It is then charged again by the charger 4 and is exposed to the laser beam L now modulated in accordance with the cyan component image signal, so that an electrostatic latent image is formed on the photosensitive drum 3. During this, the developing apparatus 1 rotates to present the cyan developing device 1C to the predetermined developing position to reverse-develop the cyan latent image to form a cyan toner visualized image.

The above process is repeated for the yellow image signal and the black image signal. When the image transfer operations for the four color visualized (toner) image are completed, the transfer material is electrically discharged by chargers 13 and 14, and the gripper 7 is released to permit the transfer material to be separated from the transfer drum 9 by the separation pawl. The separated transfer material is conveyed on the conveyer belt 16 to an image fixing device 17 of heat-pressure-roller type, where the four visualized images overlaid on the transfer material are fixed at once. In this manner, the series of the full-color printing sequential operation is completed, and a full-color print is formed.

Figure 4:
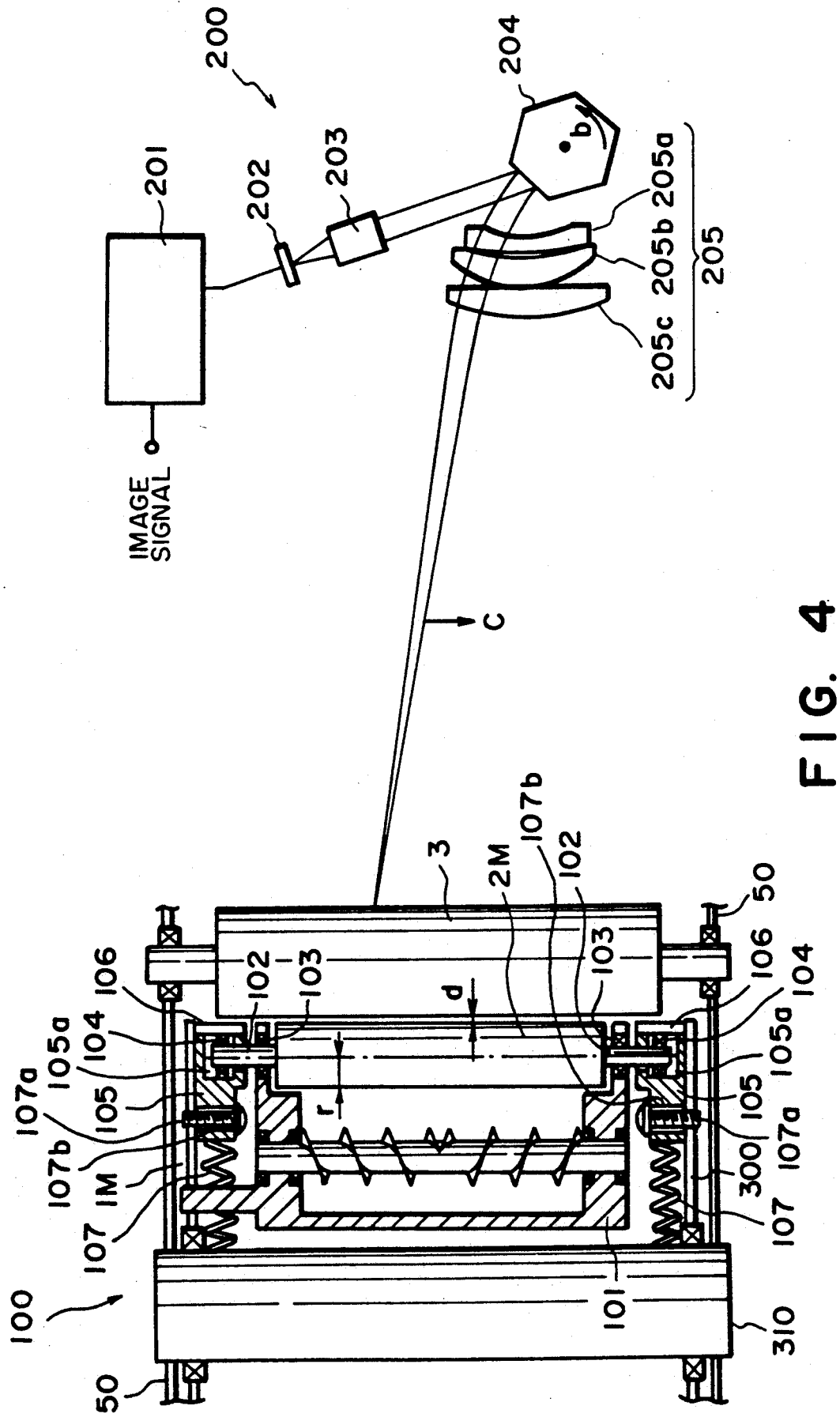
FIG. 4 illustrates a major part of the apparatus according to an embodiment of the present invention.

As shown in FIG. 4, the exposure means 200 includes a semiconductor laser 202, a collimator lens 203, a polygonal mirror 204 rotating at a high speed and an f-$\theta$ lens 205. The semiconductor laser 202 produces a laser beam L which is modulated in accordance with time-series digital picture element (pixel) signals produced by the image reader or by an electronic computer or the like. The laser beam L thus produced is projected on the surface of the photosensitive drum. The laser beam L is projected to such a portion of the drum 3 where the toner is to be deposited, and therefore, the developing device reverse-develops the latent image by which the toner particles charged to the same polarity as the charging polarity by the charger 4 is deposited on the right potential portion of the latent image.

With continued reference to FIG. 4, the semiconductor laser element 202 which is the laser source is connected with a laser driver 201 which functions as an emitting signal generator for supplying an emitting signal (driving signal) for producing the laser beam. The laser is lit on and off in accordance with the emitting signal of the laser driver. The laser beam L emitted from the laser element 202 is substantially collimated by a collimator lens system 203.

The polygonal mirror, that is, the rotatable mirror 204 having plural reflecting surfaces rotates at a constant speed in the direction of an arrow b to scanningly deflect the collimated beam through the collimator lens system 203. The f$\theta$ lens system 205 (205a, 205b and 205c) disposed in front of the polygonal mirror 204 functions to form a spot on the surface to be scanned, that is, the surface of the photosensitive drum 3 from the laser beam deflected by the polygonal mirror 204, and to provide a constant scanning speed on the surface to be scanned. The direction of movement of the beam L on the drum 3 by the polygonal mirror 204, that is, the direction indicated by the arrow c is called "main scan direction". The main scan direction is a direction with a movement direction of the surface of the drum 3 in the exposure station, preferably substantially perpendicular thereto. On the other hand, the movement detection of the drum 3 in the exposure station is called "sub-scan direction". By the main scan and the sub-scan, the surface of the photosensitive drum 3 is raster-scanned by the laser beam. By doing so, the electrostatic latent image is formed on the photosensitive drum 3 in accordance with the signals representing the images to be recorded.

Figure 5:
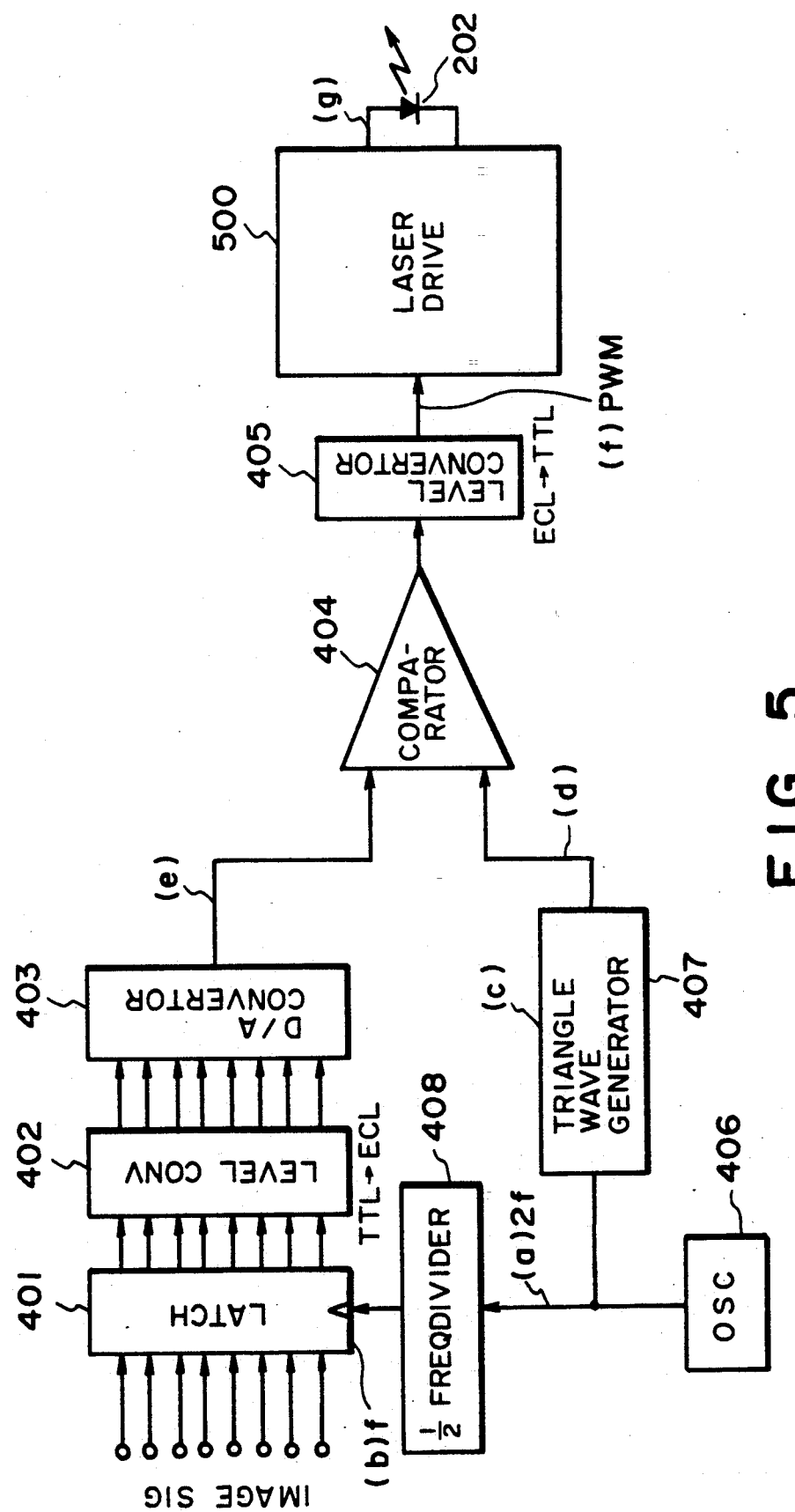
FIG. 5 is a block diagram showing a pulse width modulation (PWM) circuit.

Referring to FIG. 5, the PWM circuit 201 will be described. In FIG. 5, the PWM circuit 201 includes a TTL latching circuit 401 for latching 8 bit image signal, a level converter 402 for converting the TTL logic level into a high speed ECL logic level, an ECLD-A converter 403, an ECL converter 404 for producing the PWM signal, a level converter 405 for converting the ECL logic level to the TTL logic level. A clock generator 406 for producing clock signals $2f$ having the frequency which is twice of the pixel clock signal f, a triangular wave generator 407 for generating substantially ideally triangular wave signal in synchronism with the clock signal $2f$, and $\frac{1}{2}$ frequency divider 408 for dividing the frequency of the clock signal $2f$ by 2. For the purpose of high speed operation in the circuit, the ECL logic circuit is disposed at various parts.

Figure 6:
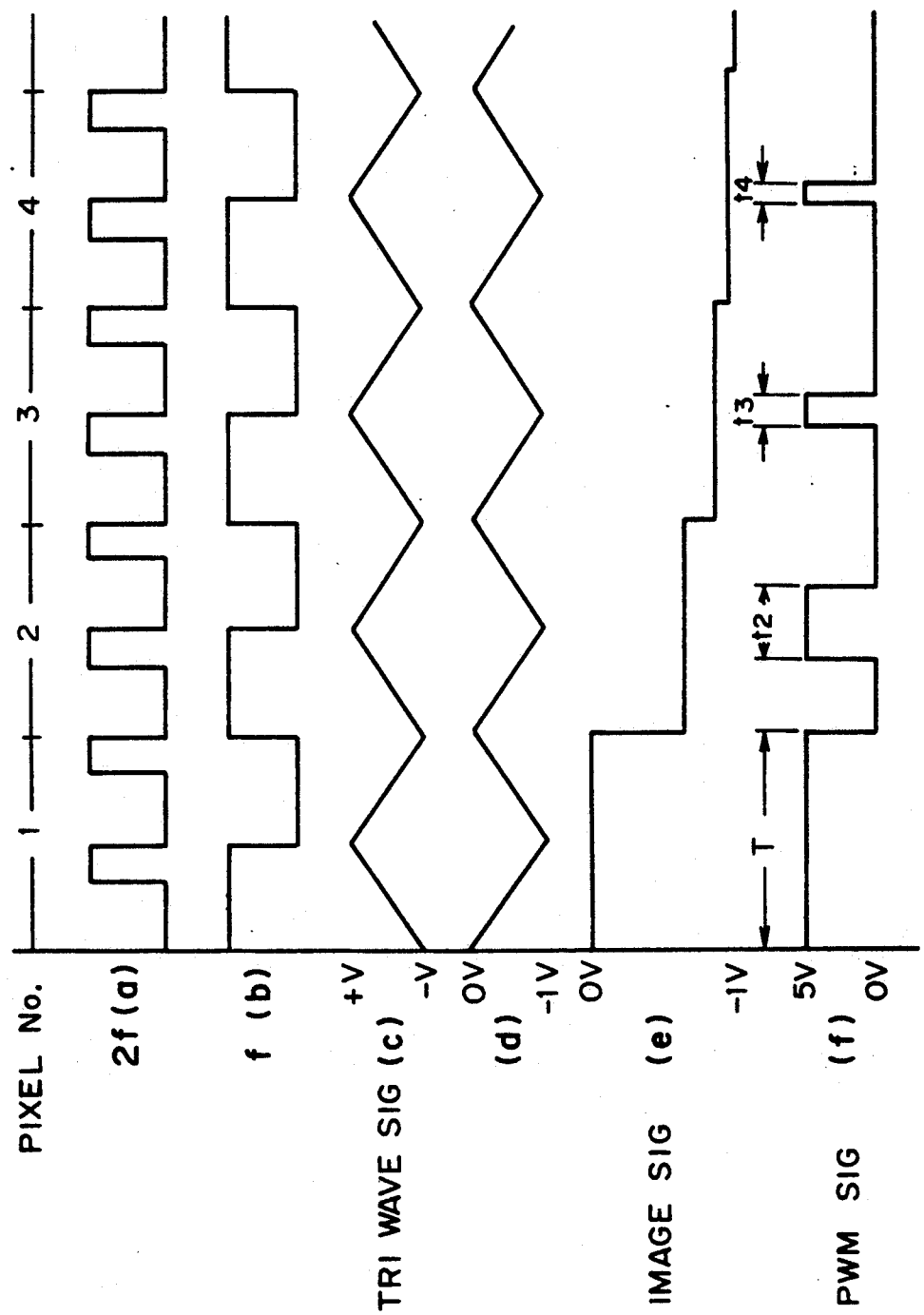
FIG. 6 shows a signal waveform in the PWM circuit.

Referring also to FIG. 6, the description will be made as to the operation of the circuit, FIG. 4 showing the waveform of the signal.

A signal (a) is a clock signal $2f$, and signal (b) is a pixel clock signal f having a double frequency, and is associated with the pixel number, as shown in the Figure. In order to maintain the duty ratio of 50 % of the triangular signal also in the triangular wave generator 407, the clock signal $2f$ is temporarily divided by 2, and then, the triangular signal (c) is generated. Further, the triangular signal (c) is converted to the ECL level (0- -V), and is now the triangular wave signal (d).

On the other hand, the pixel signal varies over the range of 256 tone gradation levels from 00H (white)—FFH (black). The mark H represents hexaexpression. The image signal (e) shows the ECL voltage level after the D/A conversion. In FIG. 4, the first pixel has the FFH voltage level which is for the maximum density; the second pixel has the 80H voltage level which is intermediate; the third pixel has the 40H voltage level which is for an intermediate density level lower than the second pixel; and the fourth picture element has the 20H voltage level which is for an intermediate density lower than the third pixel.

Figure 1:
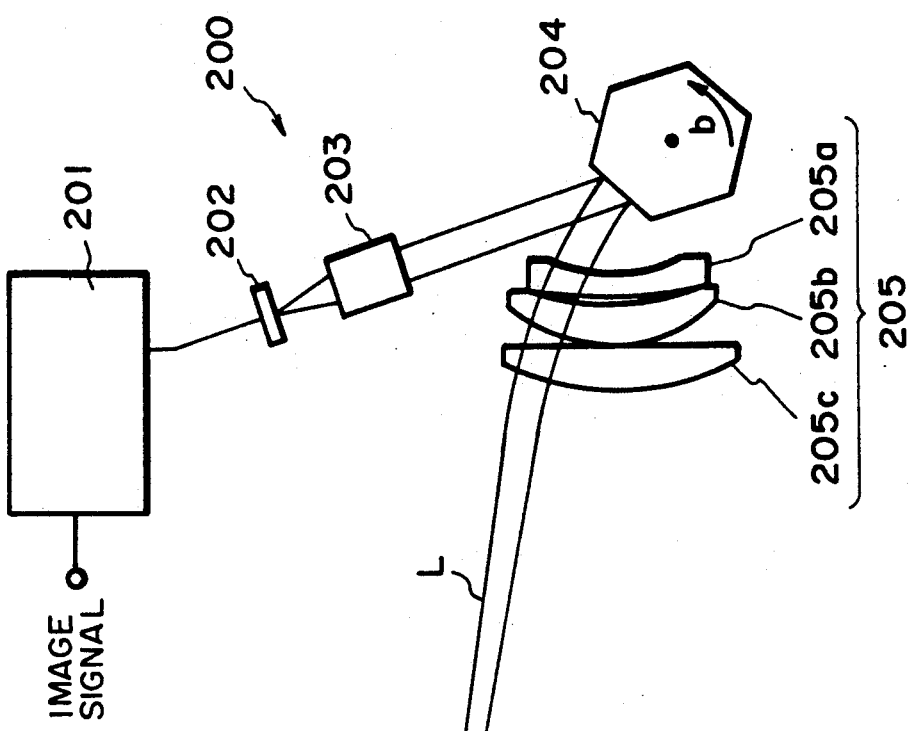
FIG. 1 illustrates a conventional image forming apparatus.
Figure 1:
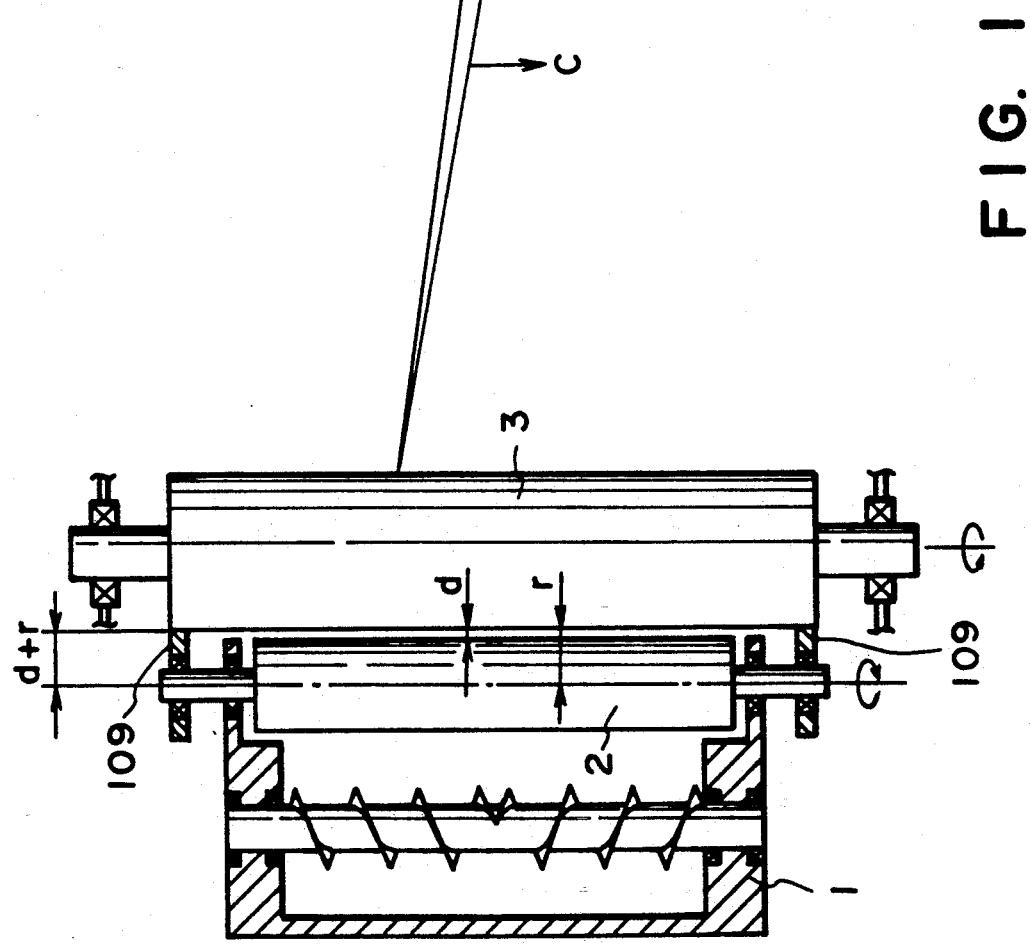
Figure 2:
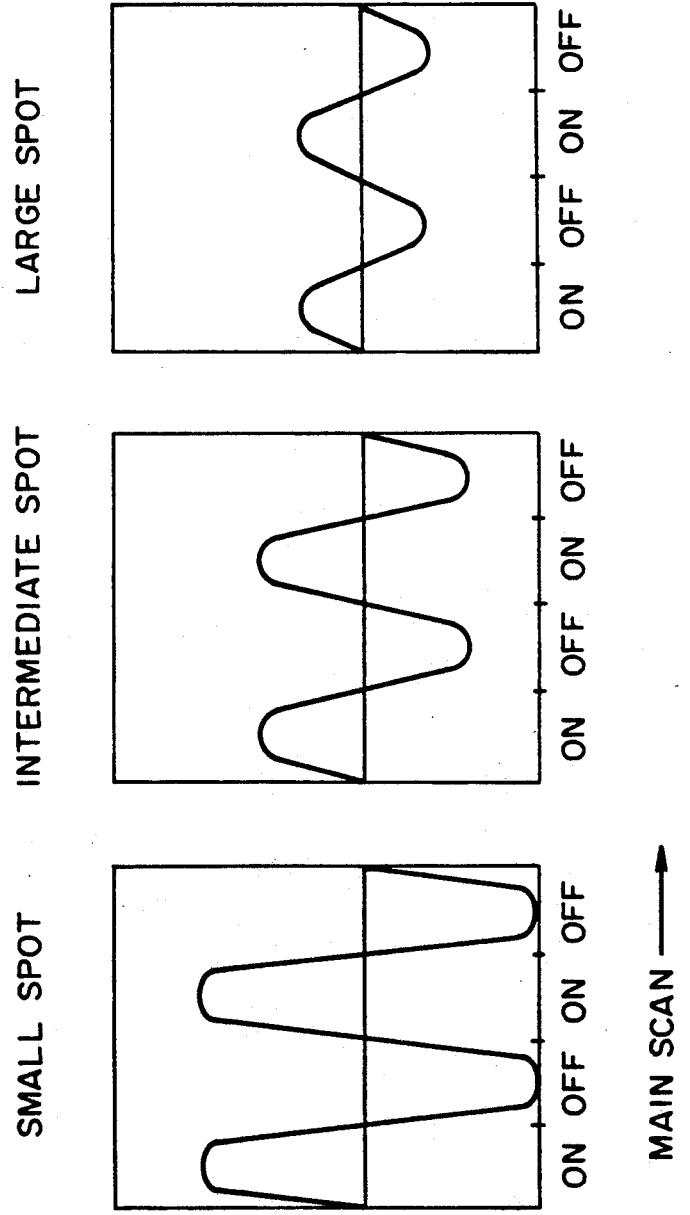
FIG. 2 illustrates a laser beam spot and an exposure amount distribution thereof.

A comparator 404 compares the triangular signal (d) and the image signal (e), and produces PWM signals having pulse widths corresponding to the pixel density to be formed. In the example of FIG. 1, these pulse widths are indicated by T, $t_2$, $t_3$ and $t_4$, where $T>t_2>t_3>t_4$. The PWM signals are converted to the TTL levels which are either 0 V or 5 V into the PWM signals (f) which is a laser driving pulse signals (256 kinds of signals including zero). The PWM signals (f) are supplied to the laser driving circuit 500. Thus, the semiconductor laser 202 emits, for each of the pixels, a laser beam for a period corresponding to each of the pulse widths of the signals (f) to scanningly expose the photosensitive member 3 thereto. In the printer of this embodiment, the reverse development is effected, and therefore, the laser beam emitting period is longer if the image density is higher.

In the circuit of FIG. 5, the upstream side of the latching circuit 401 is equipped with an unshown look-up table. The look-up table is for a $\gamma$ correction (tone gradation correction) of the image data and is the memory storing the $\gamma$-corrected data. The memory is accessed by the address data which is the 8-bit image signal per picture element, so that the $\gamma$-corrected image signal is outputted. Usually, a particular one $\gamma$-correction table is used in one frame or page, but it is possible that several kinds of $\gamma$-correction tables are prepared, and some of them are used selectively in the frame. That is, three tables are sequentially and repeatedly used for the respective line scans by the beam, so that the $\gamma$-correction in the sub-scan direction is changed line by line to correct the tone gradation.

The look-up table or tables are prepared so that the correction thereof is not influenced by the densities inherent to the respective color toners, i.e., the yellow toner, the magenta toner, the cyan toner and the black toner. More particularly, when the density of the toner is low, the correction table is prepared on the basis of a steep $\gamma$ curve, whereas when the density is high, the opposite property $\gamma$ table is prepared. Thus, the $\gamma$ tables are provided for the respective colors. Upstream of the look-up table, it is possible that a non-linear color masking circuit, for example, a secondary color masking circuit, may be provided to correct turbidity.

In the color printer shown in FIG. 3, the PWM circuit (FIG. 5) is sequentially supplied with the yellow, the magenta, the cyan and the black image signals for each of the pages (one page of the original and copy). The image signals are sequentially modulated for the respective colors. By four rotations of the drum 3, one color copy is produced. In the apparatus of FIG. 13 which will be described hereinafter, the PWM circuit is provided for each of the colors.

In this embodiment, at the upstream of the look-up table provided for each of the colors, a nonlinear masking circuit is provided to correct the turbidity for each of the colors. The masking circuit is in the form of a secondary color masking circuit, for example.

The latent image formation in the image forming apparatus having the structure described above will be described. As stated hereinbefore, the photosensitive drum 3 is uniformly charged by a primary charger 4, and is exposed to the laser beam L from the laser beam exposure device 200, so that a latent image is formed. The latent image is developed by a developing unit.

Figure 7:
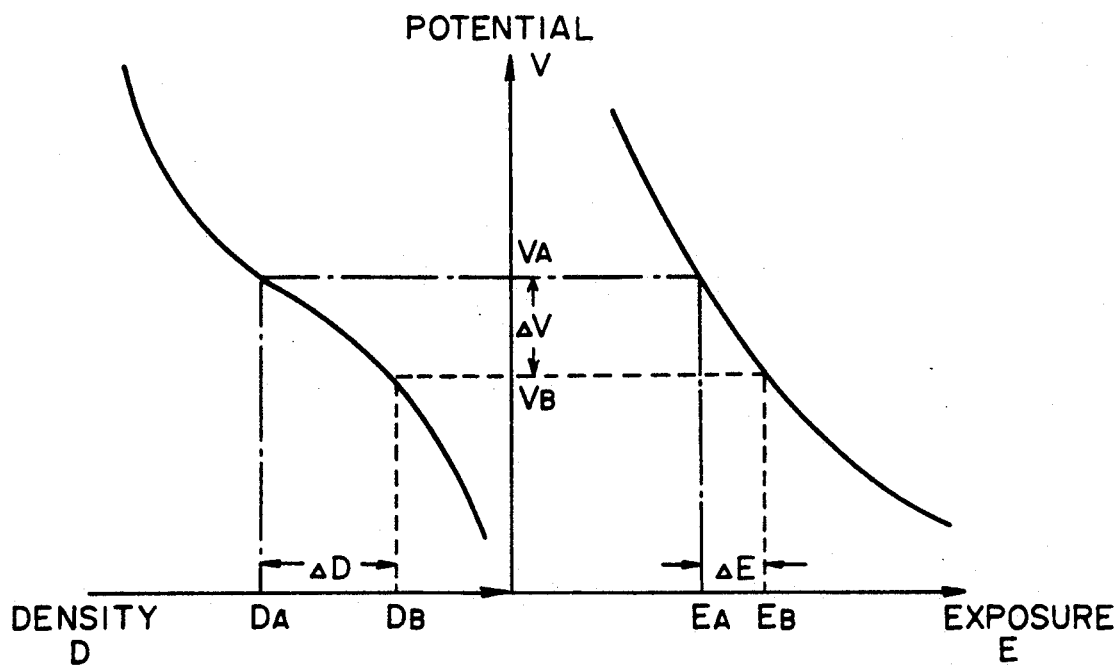
FIG. 7 is a graph showing a relation among an image density, a potential and an exposure amount.

Referring to FIG. 7, the formation will be further described. When the amount of exposure of the photosensitive drum to the laser beam changes by $\Delta E$ from $E_A$ to $E_B$, the potential $V_A$ on the photosensitive drum 3 changes to $V_B$. The potential change appears as the developed image density change $\Delta D = D_A - D_B$ due to the developing performance.

Figure 8:
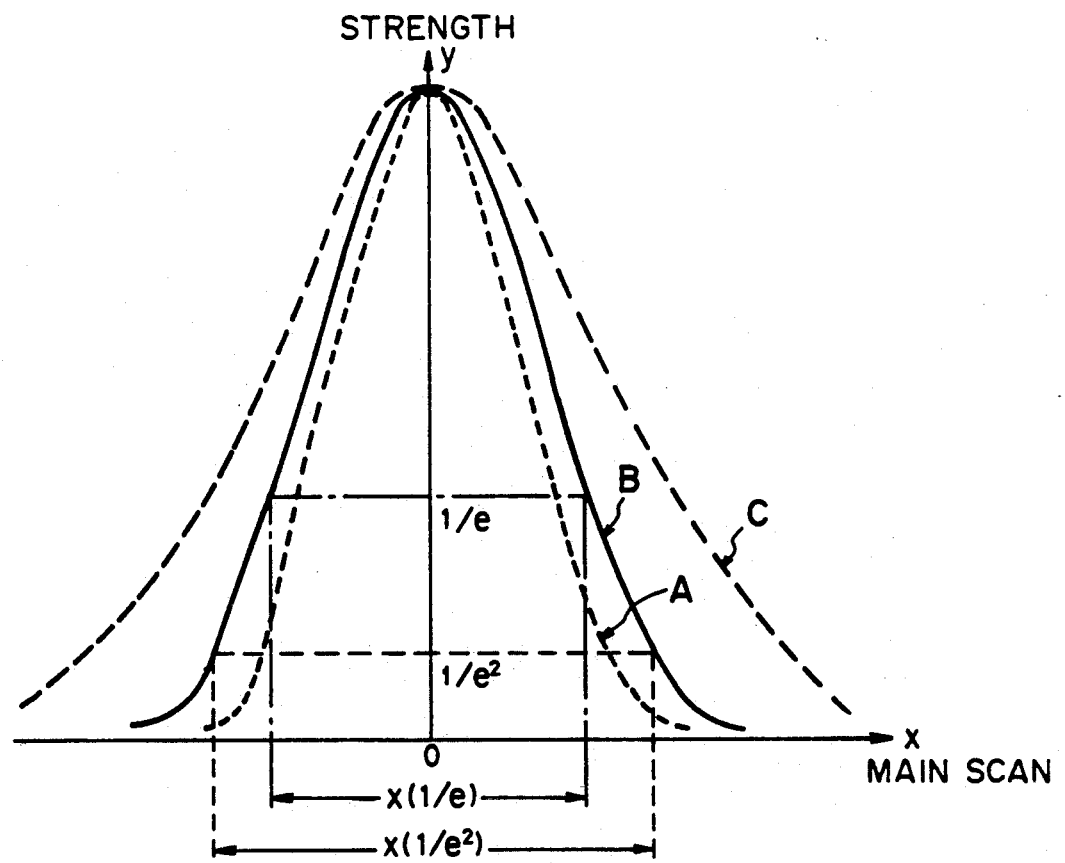
FIG. 8 is a graph showing the intensity distribution of the laser beam spot.

Generally, the intensity distribution in a laser beam spot is in the form of a Gaussian distribution, as shown in FIG. 8. It is considered that the microscopic potential distribution of the beam spot portion of the photosensitive drum is also similar to the curve of FIG. 8 in accordance with the E-V characteristics of the photosensitive drum.

Developing operation for the electrostatic latent image involves a threshold level. More particularly, the toner is deposited on the portion of the photosensitive member having a certain level of potential, but is not deposited on the portion thereof having the potential lower than the potential level. In the case of reverse development, the toner is deposited to the region having the potential lower than the threshold potential level in the absolute value, but the toner is substantially not deposited on the portion having the potential higher than the threshold potential in the absolute value. Therefore, when the microscopic potential distribution, that is, the exposure distribution, changes, as shown in FIG. 8, the developed width (length on the X axis in FIG. 8) for a certain potential threshold (the threshold of the intensity in the exposure distribution of FIG. 8), would change.

The inventor has particularly noted the intensity distribution of the laser beam spot and the configuration thereof shown in FIG. 5, and has carried out experiments using laser beams having the distributions A, A', B, C and C', as shown in the following Table:

TABLE 1

| | $X(1/e^2)$ (μm) | $X(1/e^2)/X(1/e)$ | Reproducibility | Tendency of stripe production |
|---|---|---|---|---|
| A | 30 | 1.40 | ⊚ | ○ |
| A | 30 | 1.60 | ⊚ | △ |
| B | 45 | 1.40 | ○ | ○ |
| C | 70 | 1.40 | △ | ○ |
| C | 70 | 1.60 | △ | △ |

⊚: very good
○: good
△: fairly good but improvement is desired

From the results of the experiments, (1) The image reproducibility is improved with reduction of laser beam diameter ($x(e/e^2)$): and (2) The white stripe in the image is reduced more with the reduction of the sharpness of the intensity distribution, that is, with the reduction of ($x(e/e^2)/x(e/e)$).

It is considered that the energy per unit area increases, and therefore, the microscopically deeper potential distribution is provided, with the reduction of the diameter of the laser beam. The reason why the reduction of the white stripe is considered as being that the distribution of the potential of the latent image becomes more sharp with the sharpness of the intensity distribution, and therefore, the change in the developed with with the change of the developing threshold, becomes small.

It has been found from the experiments that when the $1/e^2$ spot diameter, that is, $\times(e/e^2)$ is not more than 45 microns, and the ratio of $e/e^2$ diameter in the main scan direction of the laser beam spot to $1/e$ diameter, that is, $x(1/e^2)/x(1/e)$) this corresponds to the degree of sharpness of the intensity distribution of the laser spot is not more than 1.6, then, a high resolution and white stripe free image can be produced, and in addition, when the PWM type image forming apparatus, the tone reproduction is very good.

Here, $1/e^2$ diameter, that is, $x(1/e^2)$ means a width, measured in the main scan detection, of the portion of the intensity distribution of the laser beam spot which has the intensity of $1/e^2 \times$ (maximum intensity); and $1/e$ diameter, that is, $x(1/e)$ is a width, measured in the main scan direction, of the portion of the laser beam spot intensity distribution which have the intensity equal to $(e/e^2) \times$ (maximum intensity) (FIG. 8).

It is understood by one skilled in the art that a divergence angle of the beam emitted from the semiconductor laser 202, the powers of the lenses 203, 205a, 205b and 205c are properly selected, in order to provide $x(1/e^2)$ of 45 microns or smaller and $x(1/e^2)/x(1/e)$ of 1.60 or smaller.

As described hereinbefore, when the laser beam spot diameter is reduced, the depth of focus of the lens system becomes small. In the case of the image forming apparatus wherein the developing device is contacted to the photosensitive drum, the laser beam spot diameter relatively largely changes due to the vibration, with the result of deterioration of the image quality.

In this embodiment of the present invention, the developing device is supported out of contact with the photosensitive drum, so that the above inconvenience is avoided. The description will be made in detail.

Figure 9:
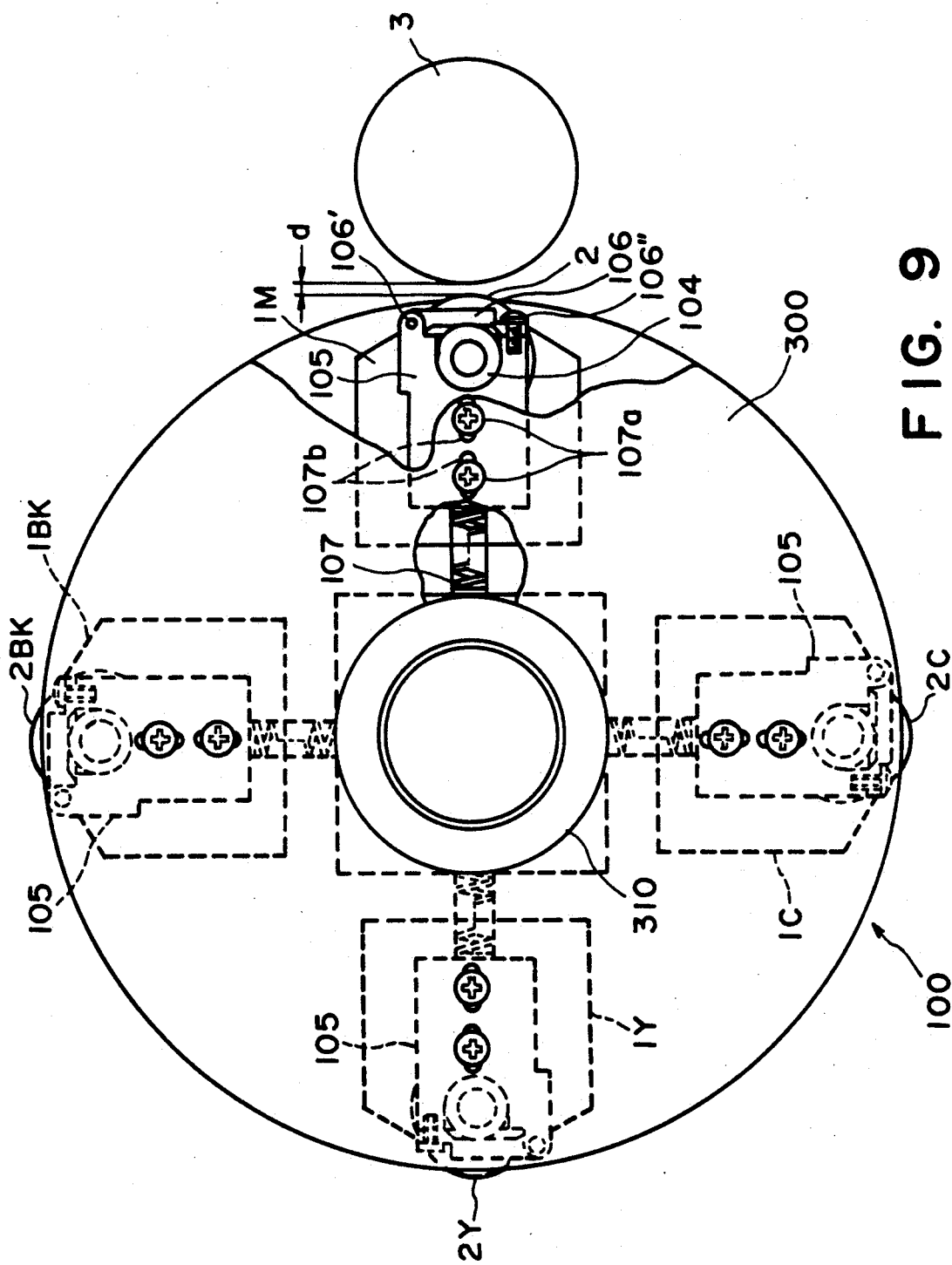
FIG. 9 is a partly sectional view of supporting means for a developing device

Referring to FIGS. 4 and 9, the description will be made further as to the rotary type developing device 100 used in the image forming apparatus. In FIG. 4, only one, that is, magenta developing unit 1M among the four units is shown, but the other developing units are supported on the rotary frame 300 in the same way. The mechanical structures of the developing units are the same, and the only difference is in the color of the developer contained therein.

Each of the developing units includes a container 101 for accommodating the developer. The container 101 rotatably supports through a bearing 103 the developing roller, that is, a cylindrical nonmagnetic sleeve 2M. In the sleeve 2M, a stationary magnet which will be described hereinafter is disposed.

At the opposite ends of a shaft 102 of the developing roller 2M, bearings 104 (cylindrical members) are rotatably mounted to the shaft 102. In this specification, the bearings 104 are part of the shaft of the roller 2. Supporting members (positioning members) 105 for supporting the bearings 104 are fixed on the rotary frame 300 for positional adjustment. The supporting member 105 is provided with a cut-away portion at one side so as to permit mounting and dismounting of the developing unit at a position other than the operating position, and supports an arm 106 for engaging and fixing the bearing 104 to the supporting member 105.

The arm 106 is rotatable about a shaft 106' for mounting it to the supporting member 105 so as to permit mounting and dismounting of the developing device 1M. By pushing the bearing 104 to the supporting member 105 the developing roller 2M and the developer container 1M can be placed at a predetermined position relative to the photosensitive drum 1.

In order to permit adjustment of the distance d between the photosensitive drum 3 and the developing roller 2M in FIG. 4 when the image forming operation is not performed, for example, when the developing device is assembled, the position of the supporting member 105 fixedly mounted to the rotary frame 300 is changeable to change the distance d.

Figure 10:
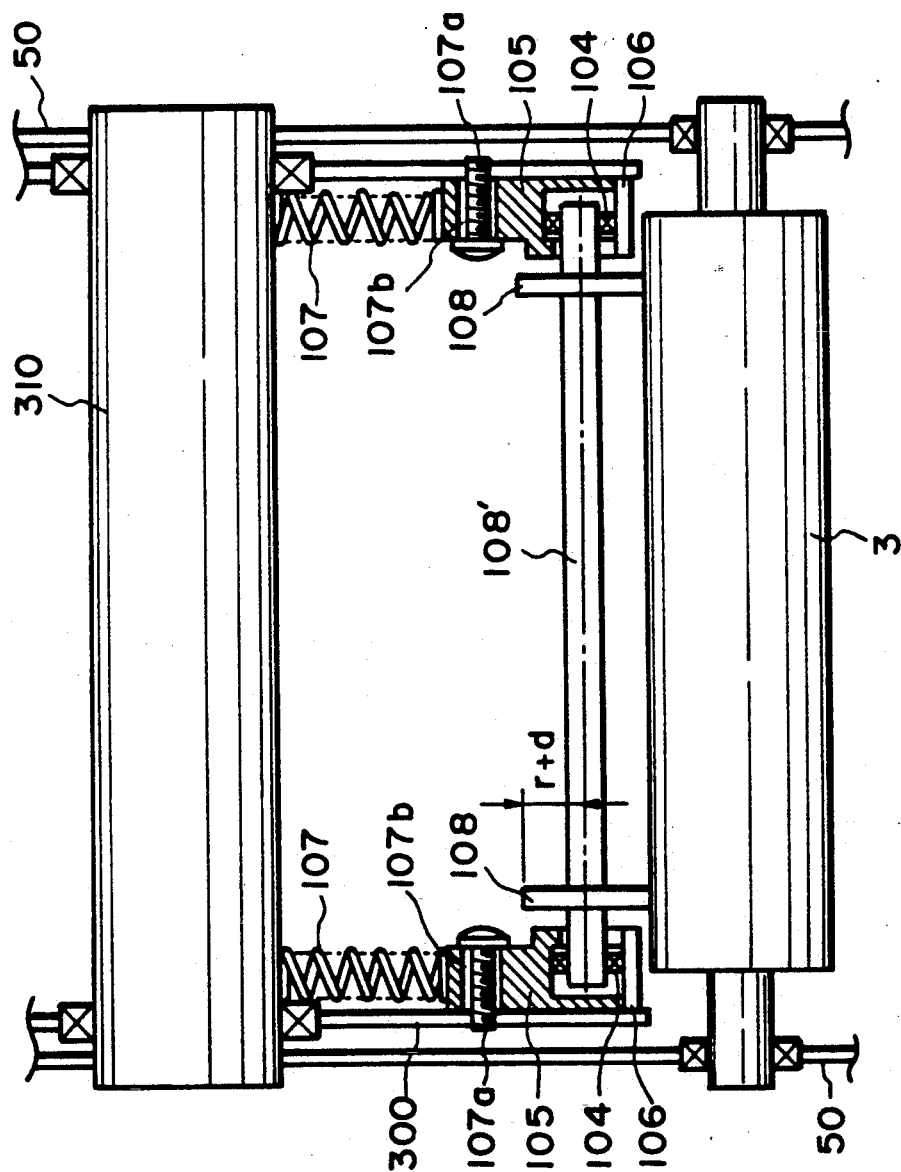
FIG. 10 illustrates adjustment of the developing device supporting means.

Particularly, an urging spring 107 urges the supporting member 105 in a radial direction of the rotary frame 300. As shown in FIG. 10, a tool 108' has a cylindrical member 108 having a radius equal to a sum of a radius r of the developing roller 2M and the distance d (small distance such as not less than 0.1 mm and not more than 1 mm) between the developing roller 2M and the photosensitive drum 3. The tool 108' is mounted on the supporting member 105 supporting the bearing 104, and thereafter, the tool 108 is presscontacted to the photosensitive drum 1 using the urging force of the spring 107. Then, the supporting member 105 and the rotary supporting member 300 are fixed by screws 107a. Subsequently, the tool 108' is dismounted from the supporting member 105. In place thereof, the developing roller 1M having a radius r and associated with the bearing 104 engaged with the haft 102 is mounted on the supporting member 105 by which the distance between the photosensitive drum 1 and the developing roller 2M is set to be d.

In the similar manner, the position of the supporting member 105 of each of the developing unit on the rotary frame 300 is adjusted, and each of the supporting members 105 is fixed on the rotary frame 300.

An elongated slot 107b is formed to permit movement of the supporting member 105 relative to the rotary frame 300 so as to adjust the distance between the developing roller and the photosensitive drum. A fixing screw 107a is inserted through the elongated slot 107b. In FIGS. 4 and 10, one elongated slot 107b and one screw 107a are used for one supporting member 105. However, as shown in FIG. 9, two elongated slots 107b and two fixing screws 107a may be used for one supporting member 105. A screw 106" securely fixes to the supporting member 105 the arm 106 for urging the bearing 104 to the supporting member 105.

In the foregoing embodiment, the developing unit is correctly positioned by engagement between the shaft of the developing roller 2M and the supporting member (positioning member) 105. This method is very preferable in that he gap d between the photosensitive drum 1 and the developing roller 2M can be set with as small as possible mechanical error. However, it is possible that a projection or the like is formed on the container 101, and the projection is engaged to a supporting member position-adjustably fixed on the rotary frame 300, thus positioning the unit.

A common frame 50 functions to support the drum 3 and the shaft 310 for the rotary frame 300.

In the foregoing embodiment, an electrophotographic apparatus is taken in which the plural developing units are rotated to form a multicolor image. However, the present invention is applicable to a multi-color image forming apparatus wherein plural developing devices are movable parallel, as shown in FIG. 7.

Figure 11:
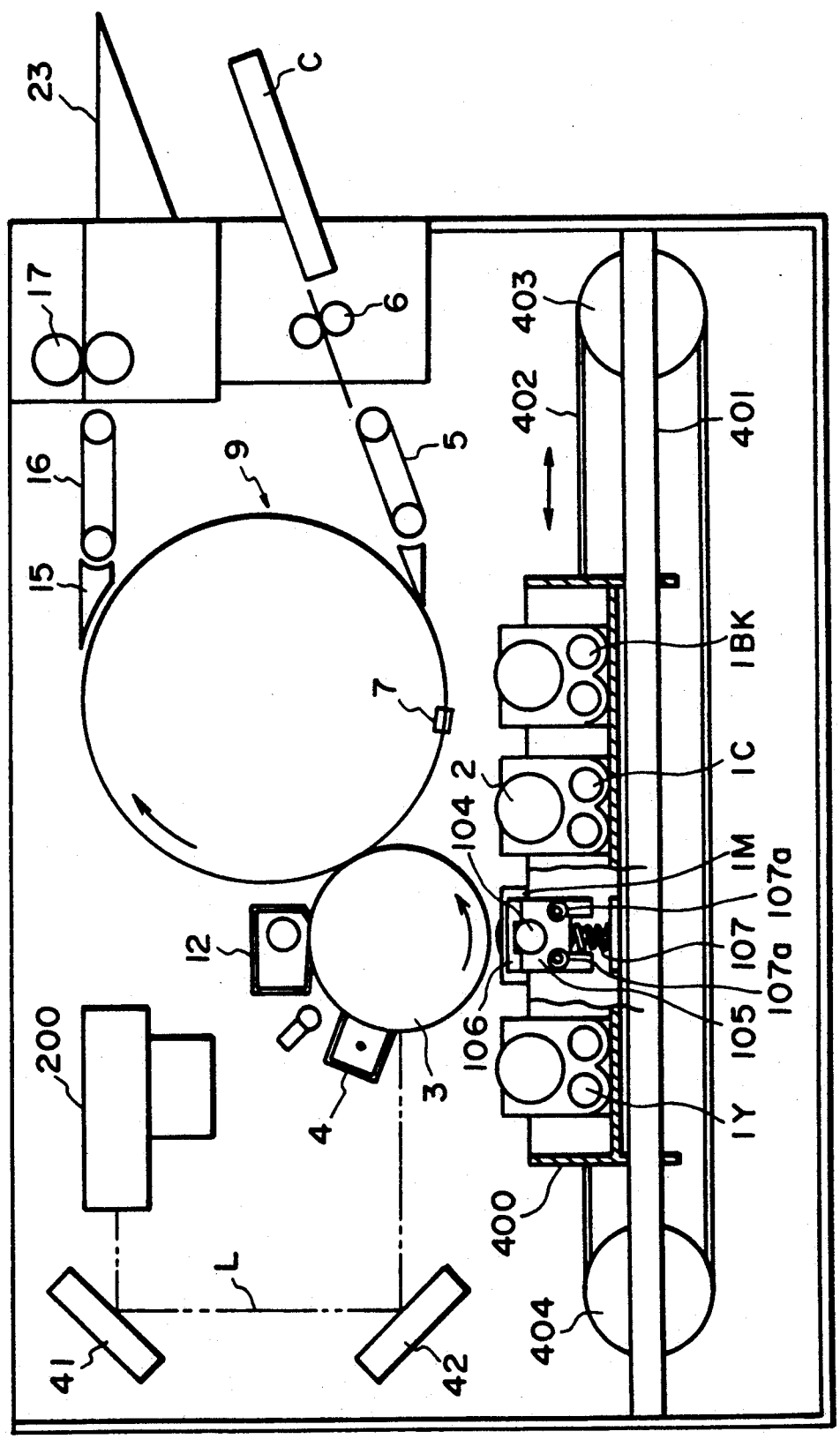
FIG. 11 is a sectional view of an apparatus according to another embodiment of the present invention.

In the embodiment of FIG. 11, similarly to the foregoing embodiments, the apparatus comprises a photosensitive drum 1, developing units 1Y-1BK for development in the respective colors, a developing roller 2 supported in each of the developing units, bearings 104 supported at opposite ends of each of the developing rollers 2, a supporting member (positioning member) 105 engaged with and supporting the bearing 104, a fixing arm 106 for fixing the developing unit 1 and an urging spring 107 to be used when the position of the supporting member 105 is adjusted.

In this embodiment, similarly to the foregoing embodiment, a tool 108' is used to adjust the position of the supporting member 105. Thereafter, it is fixed on a supporting table 400 by screws 107a. Subsequently, the developing unit having the developing roller 2M having the radius r is supported by the supporting member 105 and the arm 106, by which a desired distance d can be provided between the photosensitive drum 1 and the developing roller 2M with the advantages of the foregoing embodiment.

The supporting table 400 carrying the four developing units in FIG. 11 is rectilinearly reciprocable in a horizontal plane along guide rails 401, by which a selected developing unit can be presented to the developing position. A driving wire 402 for the supporting table 400 is trained around pulleys 403, 404 and 402. One of the pulleys receives driving force from a motor for forward rotation.

An optical unit 200 functions to generate a laser beam L modulated in accordance with image information and to scanningly deflect the laser beam. Fixed mirrors 41 and 42 are effective to reflect the laser beam to direct it to the drum 3. In the apparatus of FIG. 11, the reverse development is used.

Figure 12:
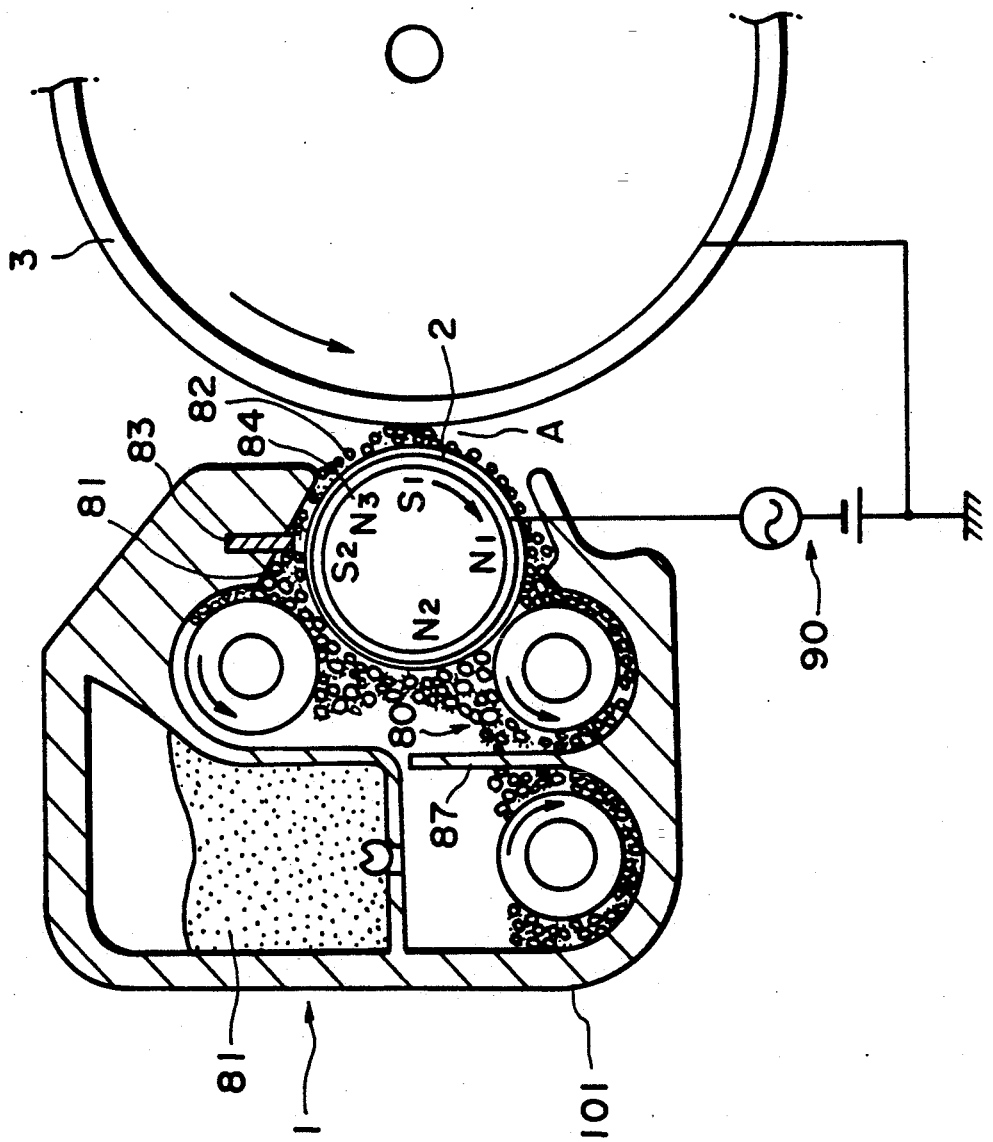
FIG. 12 is a sectional view of a developing device which is usable with the present invention.

Referring to FIG. 12, the structure of each of the developing units will be described. Each of the developing units includes a developer container 101 for accommodating the developer 80, a developing sleeve 2 functioning as a developer carrying member and a blade 83 functioning to regulate the layer of the developer.

The developer container 101 is provided with an opening at a position adjacent to the photosensitive drum 1. In the opening, the developing sleeve 2 is rotatably supported. Above the developing sleeve 2, the blade 83 is disposed with a predetermined clearance. The developing sleeve 2 is made of non-magnetic material and rotates in the direction indicated by an arrow in FIG. 12 during the developing operation. A magnet 84 functioning as a magnetic field generating mean is fixed within the sleeve 2. The magnet 84 has a developing magnetic pole S1 effective to form a magnetic brush of the developer at the developing position A where the developer 80 is supplied to the photosensitive drum 1, and magnetic poles N1, N2, S2 and N3 for conveying the developer.

The blade 4 is made of non-magnetic material such as aluminum (Al), and it is mounted so as to provide a predetermined gap with the surface of the developing sleeve 3. The gap is effective to control or regulate the amount of the developer 8 carried on the developing sleeve 3 to the developing position, more particularly, the thickness of the layer of the developer 80 on the developing sleeve 3. Since the developer is a two component developer containing nonmagnetic toner particles 81 and magnetic particles (carrier particles) 82 mixed therewith in this embodiment, both of the nonmagnetic toner and the magnetic particles are passed through the gap between the free edge of the blade 83 and the developing sleeve 3.

In this embodiment, a thin layer of the magnetic brush made of the developer carried on the sleeve 2 is lightly contacted to the photosensitive drum 3 in the developing zone A. The minimum clearance between the drum 1 and the sleeve 2 is set 0.1-1 mm.

A voltage source 90 supplies an oscillating bias voltage to the sleeve 2, the oscillating voltage being in the form of a DC voltage biased with an AC voltage. The oscillating voltage is effective to form an oscillating electric field in the developing zone A between the drum 3 and the sleeve 2, by which the toner is transferred from the surface of the sleeve and/or the surfaces of the carrier particles to the latent image. In order to prevent the production of the foggy background, the DC voltage is preferably between the light portion potential and the dark portion potential of the latent image. The waveform of the oscillating voltage may be triangular, rectangular, triangular, sine or the like. The toner is triboelectrically charged to a polarity effective to develop the latent image by the friction with the carrier particles.

In the apparatus of FIG. 1 wherein the developing device is contacted to the photosensitive drum, if the above described vibration occurs when the image is transferred from the photosensitive drum 3 to the transfer material, the fine toner image or sharp line images on the photosensitive drum 3 is disturbed, and it is transferred with the disturbance, possibly. In addition, in the cleaning process for cleaning the photosensitive drum after the image transfer step to remove the toner remaining on the photosensitive drum 3, an elastic member is contacted to the photosensitive drum, and therefore, when the photosensitive drum 3 is vibrated, the pressure of the contact therebetween is slightly changed with the result of poor cleaning performance or irregular load influential to the smooth rotation of the photosensitive drum 3. However, the embodiment is substantially free from the problems.

On the other hand, the drum 3 and/or the sleeve 2 is not completely free from some eccentricity due to the manufacturing tolerance. Therefore, if the spacer rollers as shown in FIG. 1 are not used, the clearance between the sleeve 2 and the drum 3 in the developing zone A may slightly changed with the rotations of the sleeve 2 and the drum 3. However, in the present invention, the photosensitive member is scanned in the main scanning direction with the laser beam spot having a fine spot diameter and sharp intensity distribution, that is, $x(1/e^2)$ of 45 microns or smaller and $x(1/e^2)/x(1/e)$ of 1.60 or smaller, and therefore, the potential distribution of the formed latent image is very sharp, and therefore, the deterioration of the image quality resulting from the variation in the developing threshold, that is, the deteriorations of the resolution and the tone reproducibility is suppressed, so that the high quality of the toner image is maintained.

These and other objects, features and advantages of the present invention will become more apparent upon a consideration of the following description of the preferred embodiments of the present invention taken in conjunction with the accompanying drawings.

What is claimed is:

1. An electrophotographic image forming apparatus, comprising:
   a movable electrophotographic photosensitive member;
   laser beam means for providing a laser beam modulated in accordance with signals representing images to be recorded;
   a scanning optical system for scanningly deflecting the laser beam in a main scan direction, wherein a spot diameter ($x(1/e^2)$), measured in the main scan direction, of a spot of the laser beam formed on said photosensitive member is not more than 45 microns, and an intensity distribution ($x(1/e^2)/x(1/e)$) thereof in the main scan direction is not more than 1.6;
   a developing device for developing in a developing zone an electrostatic latent image formed by the laser beam on said photosensitive member; and
   supporting means for supporting said developing means to face it in the developing zone to said photosensitive member without contact thereto.

2. An apparatus according to claim 1, wherein said laser beam means drives a laser source with a driving pulse having a width corresponding to a density of an image density of a picture element to be recorded.

3. An apparatus according to claim 1 or 2, wherein said developing device reverse-develops the latent image.

4. An apparatus according to claim 3, wherein said developing device comprises a developer carrying member for carrying the developer to the developing zone, and said apparatus further comprising a voltage source for applying an oscillating bias voltage to said developer carrying member.

5. An apparatus according to claim 4, wherein a minimum clearance between said developer carrying member and said photosensitive member in the developing zone is 0.1-1 mm.

6. An electrophotographic image forming apparatus, comprising:
   a movable electrophotographic photosensitive member;
   laser beam means for providing a laser beam modulated in accordance with signals representing images to be recorded;
   a scanning optical system for scanningly deflecting the laser beam in a main scan direction, wherein a spot diameter ($x(1/e^2)$), measured in the main scan direction, of a spot of the laser beam formed on said photosensitive member is not more than 45 microns, and an intensity distribution ($x(1/e^2)/x(1/e)$) thereof in the main scan direction is not more than 1.6;
   a developing means for developing in a developing zone an electrostatic latent image formed by the laser beam on said photosensitive member; and
   said developing means including a plurality of developing units for supplying different color developers to said photosensitive member, each of said developing units including a container for containing a developer and a developer carrying member for carrying the developer from the container to the developing zone; and
   supporting means for supporting the plurality of developing units, said supporting means being movable along a predetermined path to present a selected one of the developing units to an operating position for developing the electrostatic latent image, said supporting means including positioning means for positioning each of the developing units to face the developing unit at the operating position to said photosensitive member without contact thereto.

7. An apparatus according to claim 6, wherein said positioning means includes a plurality of positioning means engageable with each of the developing units, and said supporting means includes a movable supporting base and fixing means for adjustably fixing each of said positioning means relative to the movable supporting base.

8. An apparatus according to claim 7, wherein each of said developing units has a rotational shaft for the developer carrying member, and said positioning means is engageable with the shaft.

9. An apparatus according to claim 7, wherein said supporting means is rotatable.

10. An apparatus according to claim 7, wherein said supporting means is linearly reciprocable.

11. An apparatus according to any one of claims 6-10, wherein said laser beam means drives a laser source with a driving pulse having a width corresponding to a density of an image density of a picture element to be recorded.

12. An apparatus according to claim 11, wherein each of said developing units reverse-develops the latent image.

13. An apparatus according to claim 12, wherein each of said developing units comprises a developer carrying member for carrying the developer to the developing zone, and said apparatus further comprising a voltage source for applying an oscillating bias voltage to said developer carrying member.

14. An apparatus according to claim 13, wherein a minimum clearance between said developer carrying member and said photosensitive member in the developing zone is 0.1-1 mm.

* * * * *

UNITED STATES PATENT AND TRADEMARK OFFICE
CERTIFICATE OF CORRECTION

PATENT NO. : 5,115,259
DATED : May 19, 1992
INVENTOR(S) : MASAHIRO ITOH

It is certified that error appears in the above-identified patent and that said Letters Patent is hereby corrected as shown below:

SHEET 6 OF 11

FIG. 6, "TRI WAVE" should read --TRI-WAVE--.

COLUMN 1

Line 21, "a focal" should read --afocal--.

COLUMN 4

Line 68, "device" should read --device.--.

COLUMN 5

Line 40, "computer" should read --computer.--.

COLUMN 7

Line 29, "level (0--V)," should read --(level (0- -1V),--.
Line 50, "is a" should read --are--.

COLUMN 9

Line 35, "with" (second occurrence) should be deleted.

COLUMN 10

Line 47, "Particularly ," should read --Particularly,--.
Line 56, "presscontacted" should read --press-contacted--.

UNITED STATES PATENT AND TRADEMARK OFFICE
CERTIFICATE OF CORRECTION

PATENT NO.　:　5,115,259
DATED　　　:　May 19, 1992
INVENTOR(S)　:　MASAHIRO ITOH

It is certified that error appears in the above-identified patent and that said Letters Patent is hereby corrected as shown below:

COLUMN 12

Line 15, "mean" should read --means--.

COLUMN 13

Line 11, "changed" should read --change--.
Line 51, "thereto" should read --thereto.--.

Signed and Sealed this

Seventh Day of September, 1993

Attest:

BRUCE LEHMAN

Attesting Officer　　Commissioner of Patents and Trademarks